US011423622B2

(12) United States Patent
Okano et al.

(10) Patent No.: US 11,423,622 B2
(45) Date of Patent: Aug. 23, 2022

(54) APPARATUS FOR GENERATING FEATURE POSITIONS IN A VIRTUAL WORLD, INFORMATION PROCESSING METHOD, AND STORAGE MEDIUM

(71) Applicant: CANON KABUSHIKI KAISHA, Tokyo (JP)

(72) Inventors: Yu Okano, Yokohama (JP); Kazuki Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/893,268

(22) Filed: Jun. 4, 2020

(65) Prior Publication Data
US 2020/0388078 A1 Dec. 10, 2020

(30) Foreign Application Priority Data
Jun. 6, 2019 (JP) .............................. JP2019-106238

(51) Int. Cl.
G06T 19/00 (2011.01)
G06T 7/73 (2017.01)
G06V 10/25 (2022.01)
G06V 20/20 (2022.01)
G06F 3/01 (2006.01)
G06F 3/03 (2006.01)

(52) U.S. Cl.
CPC ............ *G06T 19/006* (2013.01); *G06F 3/011* (2013.01); *G06F 3/012* (2013.01); *G06F 3/0325* (2013.01); *G06T 7/73* (2017.01); *G06V 10/25* (2022.01); *G06V 20/20* (2022.01)

(58) Field of Classification Search
CPC .. G06K 9/00201; G06K 9/52; G06K 9/00671; G06K 9/3233; G06K 9/4604; G06K 9/6274; G06T 19/006; G06T 2210/04; G06T 7/73; G06T 7/60
See application file for complete search history.

(56) References Cited

U.S. PATENT DOCUMENTS 10,430,967 B2 10/2019 Hirota et al.
2009/0110241 A1* 4/2009 Takemoto ............ H04N 13/207
382/103

(Continued)

FOREIGN PATENT DOCUMENTS

JP 2013225245 A 10/2013

OTHER PUBLICATIONS

Andrew J. Davison, Real-Time Simultaneous Localisation and Mapping with a Single Camera, pp. 1-8, Web, http://www.robots.ox.ac.uk/ActiveVision/Papers/davison_iccv2003/davison_iccv2003.pdf, Oct. 13-16, 2003.

Primary Examiner — Jin Cheng Wang
(74) Attorney, Agent, or Firm — Canon U.S.A., Inc., IP Division

(57) ABSTRACT

Based on an image captured by an image capturing unit, a three-dimensional position in a real space corresponding to each of one or more features included in the image is estimated, a candidate region that is a region on a plane of an object existing in the real space is determined as a candidate for a region to which features are to be added based on the estimated three-dimensional position, and a recommended region to which the features are to be added is determined in the candidate region based on the number of features included in a partial region set in the determined candidate region.

17 Claims, 14 Drawing Sheets

(56) References Cited

U.S. PATENT DOCUMENTS

| | | | |
|---|---|---|---|
| 2014/0168268 A1* | 6/2014 | Oi | G01C 21/3647 |
| | | | 345/633 |
| 2015/0077434 A1* | 3/2015 | Fukuchi | G06T 19/006 |
| | | | 345/633 |
| 2017/0017830 A1* | 1/2017 | Hanai | G06K 9/52 |
| 2018/0144497 A1* | 5/2018 | Hirota | G06F 3/0325 |
| 2019/0340649 A1* | 11/2019 | Ayush | G06Q 30/0261 |
| 2020/0311428 A1* | 10/2020 | Rom | G06K 9/00671 |

* cited by examiner

APPARATUS FOR GENERATING FEATURE POSITIONS IN A VIRTUAL WORLD, INFORMATION PROCESSING METHOD, AND STORAGE MEDIUM

BACKGROUND OF THE INVENTION

Field of the Invention

The present invention relates to a positioning technique for mixing the real world and a virtual world using images.

Description of the Related Art

A mixed reality (MR) technique and an augmented reality (AR) technique have been known as a technique for mixing the real world and a virtual world. These are technologies for mixing a real space and a virtual space created by a computer in a seamless manner. These technologies are expected to be applied to various fields, such as support for assembling work by displaying a work procedure and a wiring state in a superimposed manner during assembling, and support for surgery by displaying a state inside a body in a superimposed manner on a body surface of a patient. In fact, such applications have advanced in the world.

To achieve the MR and the AR, positioning is performed to appropriately place computer graphics (CG) at an arbitrary position in a real environment. As a result of the positioning, even if a user looks around through a display, the user can always visually recognize the CG existing at one point in the real environment, and have an experience as if a physical object existed there.

Examples of a conventional technique for achieving such positioning include a technique of defining a spatial coordinate system using a marker with a characteristic black and white pattern and detecting, through image processing, the marker at a known position by observing the marker using a camera to perform the positioning.

In recent years, a technique has been proposed that achieves the positioning without using such a marker. An example of the technique is a simultaneous localization and mapping (SLAM) method. Andrew J. Davison, "Real-Time Simultaneous Localisation and Mapping with a Single Camera", http://www.robots.ox.ac.uk/ActiveVision/Papers/davison_iccv2003/davison_iccv2003.p df, discusses the basic principle of SLAM. In SLAM, when an image captured by a camera is input, a position and orientation of the camera is updated by obtaining a relative position and orientation thereof from one or more stationary features in the image. Examples of the features include a point and an edge that form an outline, in particular a corner, where there is a significant color change in the image. For example, when a cube having a different color from that of a desk is placed on the plain desk, each vertex of the cube serves as a feature point, and each outline of the cube serves as a feature edge.

An application of the MR provides an image in which CG are arranged at a specific position in the real environment using a result of positioning.

Accuracy in positioning based on a group of features in an image depends on distribution of features in an image in which the real environment has been captured, in particular, in an image per frame. In the real space, the more the number of portions serving as features is and the more evenly the portions are arranged, the higher accuracy in positioning can be expected. In contrast, an extremely small number of portions serving as features in the real space can result in a portion where accuracy in positioning is insufficient.

In the real space, there may be a case in which a sufficient number of feature portions are arranged in a visual field in one direction which the user faces, while an extremely small number of feature portions are arranged in a visual field in another direction which the user faces. In this manner, if the feature portions are not evenly arranged in the space, accuracy in positioning may be insufficient.

If the number of feature portions or distribution of the feature portions in the space is not desirable, it may not be possible to continue the positioning. However, the user using an application of the MR may not have knowledge about such characteristics of the positioning. Thus, the user realizes that a camera faces a direction not desirable for the positioning for the first time only after experiencing the application to some extent and seeing the behavior of the application showing unstable positioning.

A possible solution to the issue is to guide the camera to face a portion where distribution and the number of feature portions are appropriate in the image.

Japanese Patent Application Laid-Open No. 2013-225245 discusses a mechanism to display a guided object on a display unit presented to the user and notify the user of a recommended observation direction.

According to a conventional technique, when few portions serving as features exist or distribution of the portions is uneven in the real space at the time of positioning using an image obtained by capturing the real space, such as in the positioning used for the MR, the positioning can be performed appropriately in only in part of the real space.

A possible solution to such a situation is that the user adds features to the real space. For example, the user can arrange an object having a corner point serving as a feature in a region where distribution of features is inappropriate in the real space. Alternatively, the user can add the features to the real space, for example, by putting up a poster with a design on a plain wall and carpeting a plain floor.

However, it is not that the features can be added easily to any place where the features are insufficient. For example, it is not easy to fix an object of some kind in midair in a room where a person is having an MR experience. In this case, for example, use of a fixation device may be considered. However, the fixation device may hinder the person's pathway and ruin an experience environment. Thus, there may be a case in which the fixation device cannot be installed.

For this reason, it is important for the user to grasp an appropriate location to add features. However, the user may not have knowledge about the characteristics of the positioning. Accordingly, there may be a case in which appropriate positioning cannot be achieved because the user does not understand where to add the features in the real space and cannot add the features appropriately in the real space.

SUMMARY OF THE INVENTION

According to an aspect of the present invention, an information processing apparatus includes an acquisition unit configured to acquire an image captured by an image capturing unit, an estimation unit configured to estimate, based on the image acquired by the acquisition unit, a three-dimensional position in a real space corresponding to each of one or more features included in the image, a first determination unit configured to determine a candidate region being a region on a plane of an object existing in the real space as a candidate for a region to which features are to be added based on the three-dimensional position estimated by the estimation unit, and a second determination unit configured to determine a recommended region to which the features are to be added in the candidate region based on the number of features included in a partial region set in the candidate region determined by the first determination unit.

Further features of the present invention will become apparent from the following description of exemplary embodiments with reference to the attached drawings.

DESCRIPTION OF THE EMBODIMENTS

An exemplary embodiment to carry out the present invention will be described in detail below with reference to the accompanying drawings.

[1. Hardware Configuration]

Figure 1:
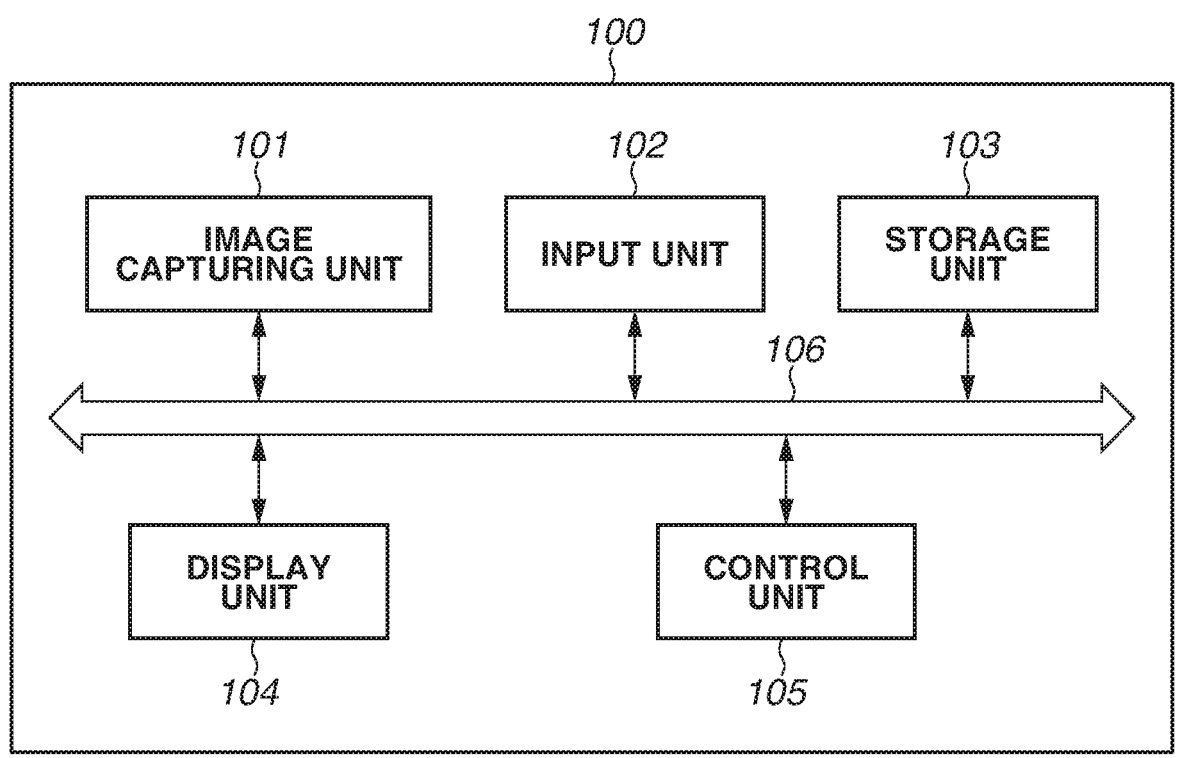
FIG. 1 is a block diagram illustrating a hardware configuration example of an image processing apparatus.

FIG. 1 is a block diagram illustrating a hardware configuration example of an image processing apparatus 100 according to an exemplary embodiment. The image processing apparatus 100 is an image processing apparatus that determines a region to which features are recommended to be added for a purpose of positioning from a captured image. While the image processing apparatus 100 is a personal computer (PC) in the present exemplary embodiment, it may be another image processing apparatus such as a server apparatus, a tablet apparatus, smart glasses, and a head-mounted display having a built-in computer.

The image processing apparatus 100 includes an image capturing unit 101, an input unit 102, a storage unit 103, a display unit 104, a control unit 105, and a bus 106. The image capturing unit 101, the input unit 102, the storage unit 103, the display unit 104, and the control unit 105 are connected via the bus 106 so that these units can communicate with one another.

The image capturing unit 101 includes one or more camera modules that capture an image. The image capturing unit 101 captures an image in a real space using an image sensor such as a charge coupled device (CCD) sensor or a complementary metal oxide semiconductor (CMOS) sensor, and generates a captured image. The captured image generated by the image capturing unit 101 serves as an input image in image processing executed by the control unit 105.

While the image capturing unit 101 is included in the image processing apparatus 100 in the present exemplary embodiment, the image capturing unit 101 may not be included in the image processing apparatus 100 and may be an external image capturing apparatus that has wired or wireless connection with the image processing apparatus 100.

The input unit 102 is an input device used by a user to operate the image processing apparatus 100 or input information to the image processing apparatus 100. The input unit 102 is, for example, a pointing device such as a mouse or a touch-pad, a keyboard, a keypad, a hard button, a hard switch, and an operating unit of a touch panel.

The storage unit 103 is a storage device that stores, for example, a variety of programs, a variety of setting information, and an image captured by the image capturing unit 101. The storage unit 103 includes a storage medium such as a semiconductor memory or a hard disk. Data stored in the storage unit 103 is, for example, a captured image, camera parameters, and data in a variety of databases (DBs). A variety of programs and a variety of data related to processing performed by the image processing apparatus 100 are stored in the storage unit 103 in the present exemplary embodiment. However, the variety of programs and the variety of data may be stored in an external storage unit (e.g., data server, network storage, and external memory). In such a case, the image processing apparatus 100 acquires the variety of programs and the variety of data from the external storage unit.

The display unit 104 is a display module including a display such as a liquid crystal display (LCD), an organic light-emitting diode (OLED) display, or a cathode ray tube (CRT) display. The display unit 104 displays, for example, an image of an application generated by the image processing apparatus 100.

While the display unit 104 is the display module included in the image processing apparatus 100, the display unit 104 may be an external display module not included in the image processing apparatus 100. In such a case, the display unit 104 has wired or wireless connection with the image processing apparatus 100.

The control unit 105 is a processor such as a central processing unit (CPU) or a digital signal processor (DSP). The control unit 105 executes processing based on a program stored in the storage unit 103 or another storage unit, thereby achieving functions of the image processing apparatus 100 that will be described below with reference to FIG. 2, and processing in the flowcharts that will be described below with reference to FIGS. 3 and 4.

The bus 106 is a transmission path that connects the image capturing unit 101, the input unit 102, the storage unit 103, the display unit 104, and the control unit 105 with one another.

[2. Functional Configuration]

Figure 2:
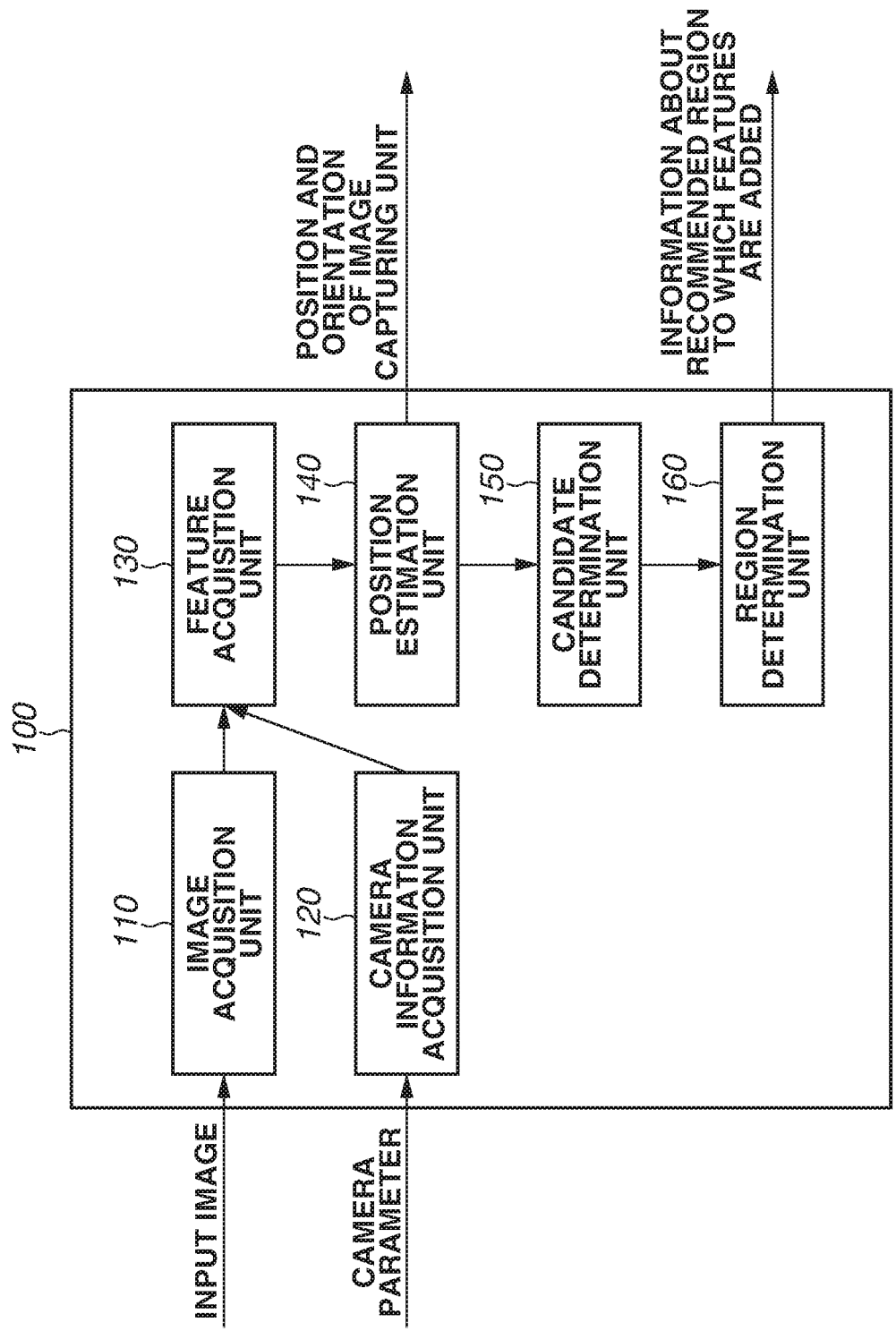
FIG. 2 is a block diagram illustrating a functional configuration example of the image processing apparatus.

FIG. 2 is a block diagram illustrating a functional configuration example of the image processing apparatus 100.

The image processing apparatus 100 includes an image acquisition unit 110, a camera information acquisition unit 120, a feature acquisition unit 130, a position estimation unit 140, a candidate determination unit 150, and a region determination unit 160.

The image acquisition unit 110 receives an image captured by the image capturing unit 101 as an input image. In the present exemplary embodiment, the image acquisition unit 110 periodically acquires, from the image capturing unit 101, an image of each frame consecutively captured by the image capturing unit 101. The image acquisition unit 110 transmits the acquired input image to the feature acquisition unit 130.

The camera information acquisition unit 120 acquires camera parameters of the image capturing unit 101. The camera parameters are parameters indicating a variety of attributes of the image capturing unit 101, and include an extrinsic parameter indicating a position and orientation of the image capturing unit 101, and an intrinsic parameter related to image capturing conditions.

The feature acquisition unit 130 acquires the input image from the image acquisition unit 110, and acquires the camera parameters of the image capturing unit 101 from the camera information acquisition unit 120. The feature acquisition unit 130 extracts one or more features reflected on the input image.

The position estimation unit 140 estimates positions of the features extracted by the feature acquisition unit 130, and estimates the position and orientation of the image capturing unit 101 in the real space based on the estimated positions of the features. The position estimation unit 140 transmits, to the candidate determination unit 150, the estimated positions of the features extracted by the feature acquisition unit 130.

The feature acquisition unit 130 and the position estimation unit 140 continuously execute processing of extracting features and estimating the position of the image capturing unit 101 for each frame captured by the image capturing unit 101 to acquire features reflected on images captured by the image capturing unit 101 at different positions and orientations. The position estimation unit 140 transmits, to the candidate determination unit 150, information about a three-dimensional position of each of one or more features extracted by the feature acquisition unit 130 as position information about each feature.

The candidate determination unit 150 receives the position information about each feature from the position estimation unit 140. The candidate determination unit 150 determines one or more regions to which features can be added in the real space based on the received position information of each feature. In the present exemplary embodiment, a region to which features can be added is selected from a plane portion of an object (e.g., wall surface, floor, and table) that already exists in the real space. More specifically, in the present exemplary embodiment, a system does not recommend addition of the features to a portion in midair in the real space by a certain means. The candidate determination unit 150 transmits, to the region determination unit 160, information about the determined one or more regions as information about the one or more regions to which the features can be added. In the description below, the one or more regions to which the features can be added and that have been determined by the candidate determination unit 150 serve as one or more candidate regions to which the features are added.

The region determination unit 160 receives the information about the one or more candidate regions from the candidate determination unit 150. The region determination unit 160 sections each of the candidate regions into individual partial regions. The region determination unit 160 determines a region in which the number of features is a threshold value or less among the partial regions to be a region to which the features are added. Then, the region determination unit 160 stores information about the determined region in the storage unit 103. In the description below, the region to which the features are added and that has been determined by the region determination unit 160 serves as a recommended region to which the features are added. The region determination unit 160 displays information about the recommended region to which the features are added on the display unit 104.

[3. Details of Processing of Image Processing Apparatus]

Figure 3:
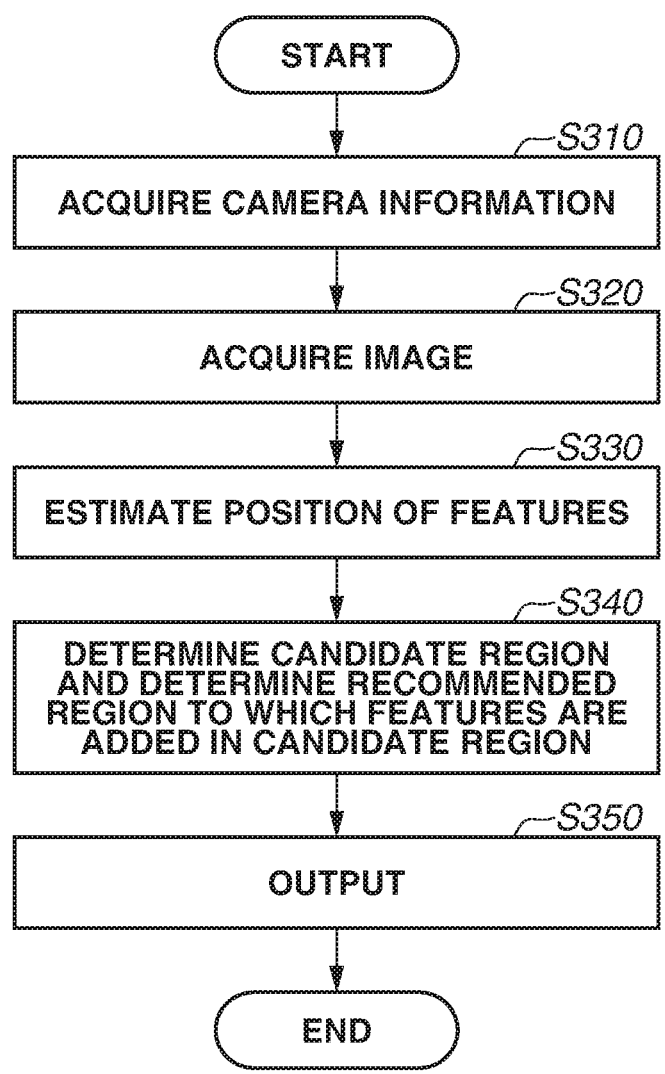
FIG. 3 is a flowchart illustrating an example of processing of the image processing apparatus.

FIG. 3 is a flowchart illustrating an example of processing of the image processing apparatus 100.

In the present exemplary embodiment, the image processing apparatus 100 determines a recommended region to which the features are added in a room. In step S310, the camera information acquisition unit 120 acquires the camera parameters of the image capturing unit 101. In the present exemplary embodiment, the camera parameters of the image capturing unit 101 are stored in advance in the storage unit 103 by the control unit 105. Thus, the camera information acquisition unit 120 acquires the camera parameters of the image capturing unit 101 from the storage unit 103. However, the camera information acquisition unit 120 may acquire the camera parameters of the image capturing unit 101 based on information input via the input unit 102. Alternatively, the camera information acquisition unit 120 may acquire the camera parameters of the image capturing unit 101 by making an inquiry to the image capturing unit 101.

In step S320, the image acquisition unit 110 acquires an image captured by the image capturing unit 101 as an input image. The image acquisition unit 110 periodically acquires, from the image capturing unit 101, a plurality of frames that have been consecutively captured by the image capturing unit 101 frame by frame. Thus, the captured images acquired by the image capturing unit 101 are different from one another in at least one of a position and a time at which each of the images is captured.

In step S330, the feature acquisition unit 130 extracts a feature from the input image acquired in step S320. In the present exemplary embodiment, the feature acquisition unit 130 detects, in the input image, a point at which a degree of change in luminance both in a lateral direction and a longitudinal direction is a predetermined threshold value or more as the feature included in the input image. In other words, in the present exemplary embodiment, the feature detected by the feature acquisition unit 130 corresponds to a portion of the image captured in such a manner that luminance significantly changes and edges caused by the significant luminance change stand out both in the lateral direction and the longitudinal direction (amounts of luminance change in the lateral direction and in the longitudinal direction are set threshold values or more).

Only a position corresponding to the feature in the input image can be acquired from the feature extracted from one frame of the input image by the feature acquisition unit 130. The position estimation unit 140 estimates a position of the feature in the real space based on the camera parameters acquired in step S310, a plurality of the input images acquired in step S320, and positions corresponding to the features in each of the input images. In the present exemplary embodiment, the image processing apparatus 100 can express the position in the real space as a coordinate value in a three-dimensional coordinate system set in the real space.

In the present exemplary embodiment, the position estimation unit 140 tracks the same feature in the input images captured by changing positions on a time-series basis by a feature tracking method called a Kanade-Lucas-Tomasi (KLT) feature tracking method, and associates the feature among the input images.

The position estimation unit 140 determines a transformation matrix called an E-matrix (fundamental matrix) from correspondence information of the feature among the acquired input images. The position estimation unit 140 obtains a position and orientation of the image capturing unit 101 from the determined E-matrix, and estimates three-dimensional position information corresponding to the feature in the real space based on a relative position and orientation among the input images. In the description below, a position corresponding to a feature in the real space is referred to as a feature point. The position estimation unit 140 transmits the estimated three-dimensional position information corresponding to each of the features as feature position information to the candidate determination unit 150.

In step S340, the candidate determination unit 150 detects a planar portion of an object (e.g., wall surface, floor, and table) existing in the real space from positions of feature points indicated by the feature position information transmitted from the position estimation unit 140. Since the position information of the features according to the present exemplary embodiment is estimated as the three-dimensional position information, the detected planar portion is not limited to a plane parallel to an image plane of the input image. In other words, the detected planar portion includes a plane expanding in a depth direction of the input image. In the present exemplary embodiment, the image processing apparatus 100 determines a region of the planar portion of the object existing in the real space as the candidate region to which features can be added. In the present exemplary embodiment, the candidate determination unit 150 uses a known technique to detect the planer portion. The candidate determination unit 150 repeats the processing of detecting one planer portion expanding in a dimension that is a set threshold value or more until it cannot detect the planer portion having the dimension that is the threshold value or more. The candidate determination unit 150 determines a region of each of the detected one or more planer portions as the candidate region, and transmits information about the candidate region to the region determination unit 160.

The region determination unit 160 determines a recommended region to which features are added based on the received information about the candidate region. More specifically, if the number of features included in a partial region set within the candidate region is a set threshold value or less, the region determination unit 160 determines the partial region as the recommended region to which the features are added.

Details of the processing in step S340 will be described below with reference to FIG. 4.

The processing in step S340 will be described in detail below with reference to FIG. 4.

Figure 4:
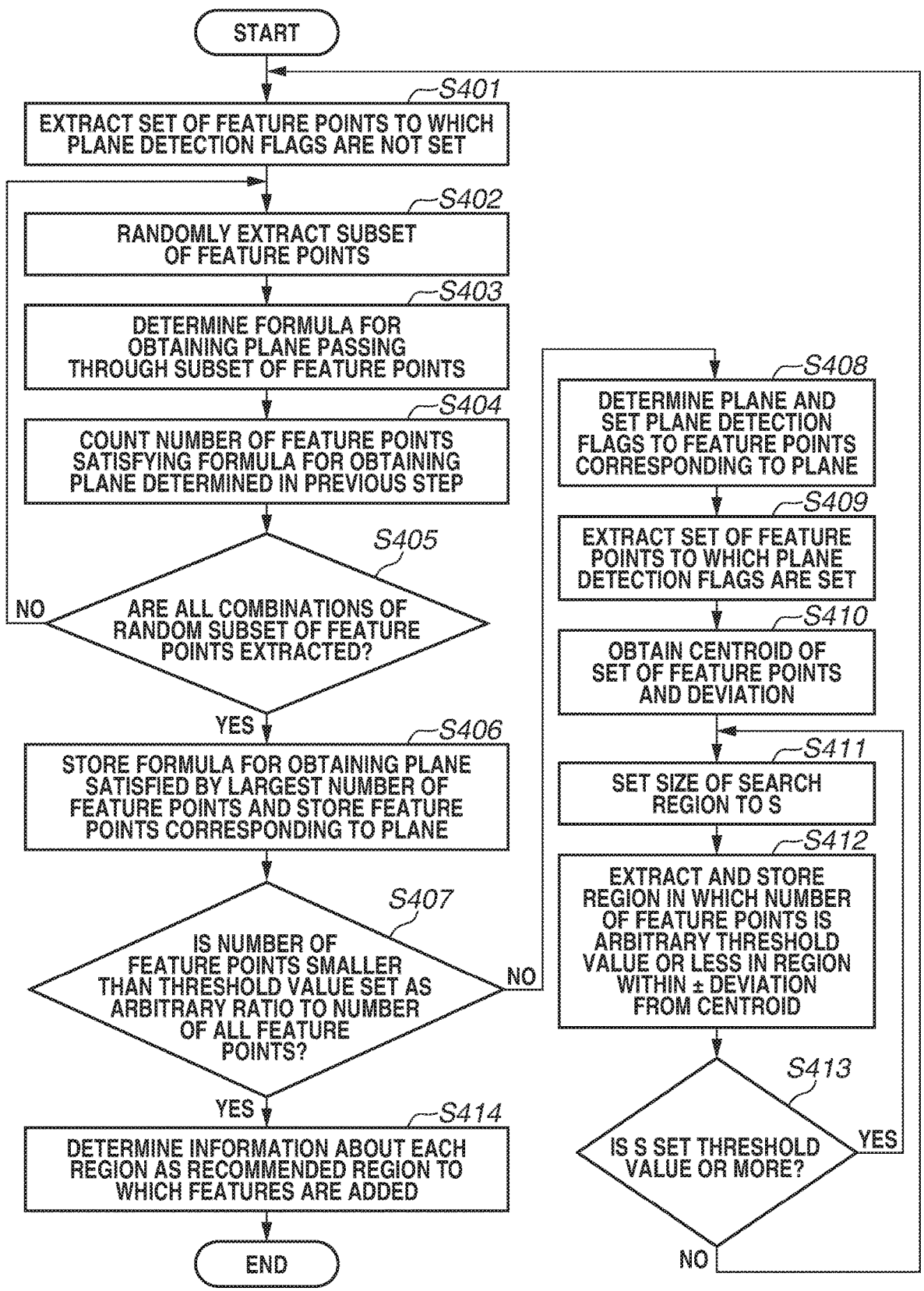
FIG. 4 is a flowchart illustrating an example of processing of the image processing apparatus.

The processing in step S401 to step S407 illustrated in the flowchart in FIG. 4 represents processing performed by the candidate determination unit 150 in step S340. The processing in step S408 to step S414 represents processing performed by the region determination unit 160 in step S340.

In step S401, the candidate determination unit 150 extracts a feature point to which a plane detection flag is not set among the feature points indicated by the feature position information (three-dimensional position information) received from the position estimation unit 140. The plane detection flag is flag information associated with each of the feature points indicated by the feature position information, and is information that indicates whether the corresponding feature point has already been used in the processing of detecting the planer portion of the object. In the present exemplary embodiment, the plane detection flag is information that takes on a binary value of 1 or 0. The value 1 of the plane detection flag indicates that the feature point corresponding to the plane detection flag has already been used in the plane detection. The value 0 of the plane detection flag indicates that the feature point corresponding to the plane detection flag has not yet been used in the plane detection. More specifically, in step S401, the candidate determination unit 150 extracts a feature point corresponding to the plane detection flag having the value 0 among the feature points indicated by the feature position information. In the description below, a set of feature points extracted in the latest processing in step S401 is referred to as a set of extracted feature points.

When the candidate determination unit 150 acquires the feature position information, the candidate determination unit 150 generates the plane detection flag for each of the feature points indicated by the acquired feature position information, initializes the value to 0, and stores the plane detection flag in the storage unit 103. In the processing in step S401 for the first time, all the plane detection flags corresponding to the feature points become 0, so that all the feature points are extracted.

Figure 5:
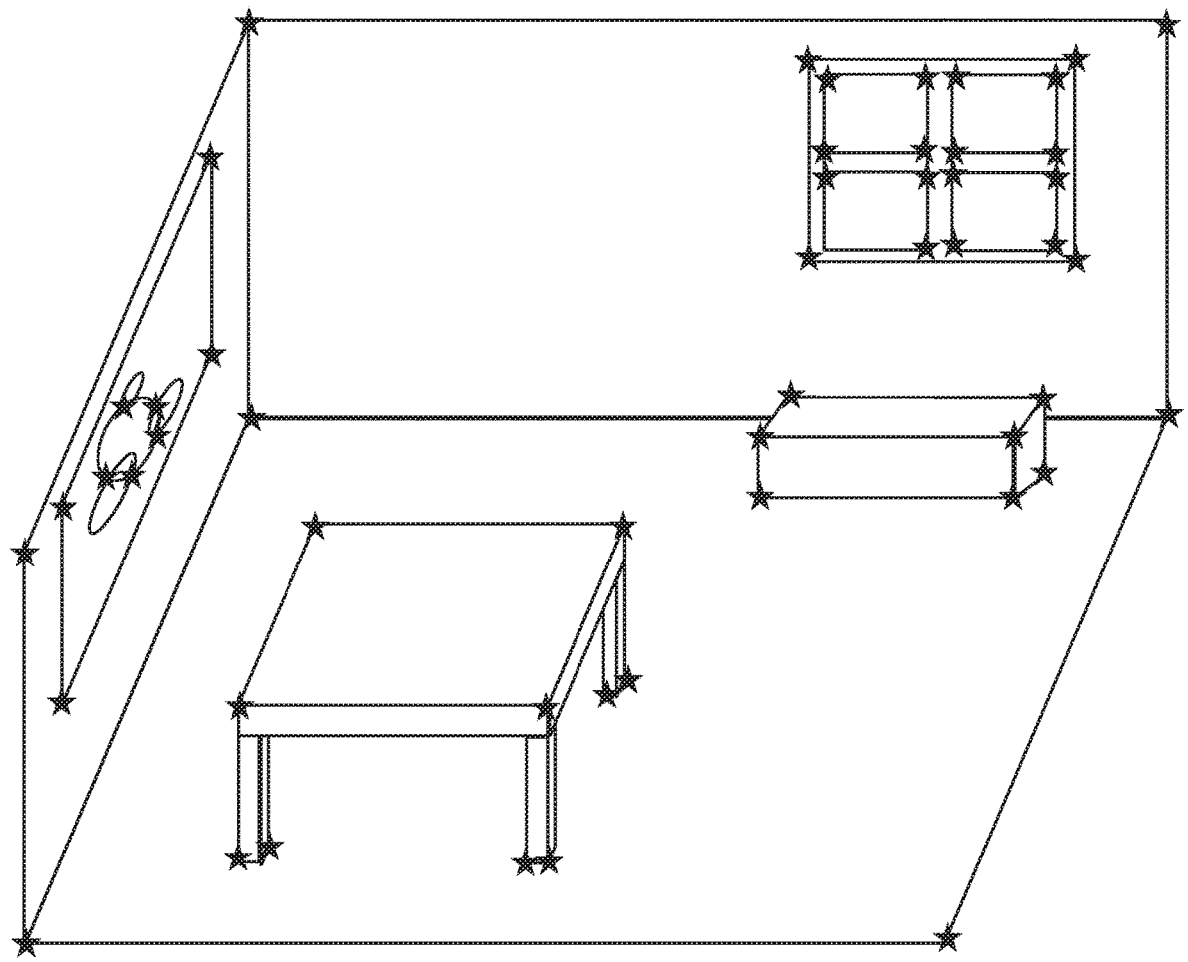
FIG. 5 is a diagram illustrating an example of processing for estimating a recommended region to which features are added.

FIG. 5 illustrates an example of the state of distribution of the feature points indicated by the feature position information in the room. Black stars in FIG. 5 represent the feature points.

In step S402, the candidate determination unit 150 randomly selects three feature points that are different from one another from the set of extracted feature points. In the description below, three-dimensional positions of the three feature points selected in step S402 are referred to as p0, p1, and p2. While the number of feature points selected in the present exemplary embodiment is three, a configuration can be employed in which any number of feature points that is three or more is selected.

In step S403, the candidate determination unit 150 obtains a plane that passes through the three feature points selected in step S402. In the present exemplary embodiment, the candidate determination unit 150 applies p0, p1, and p2 to Formula (1) below to calculate a normal line V with respect to the plane to be obtained.

$$\vec{V} = \overrightarrow{(p1-p0)} \times \overrightarrow{(p2-p0)} \quad (1)$$

The candidate determination unit 150 applies p0 and the calculated normal line V to Formula 2 below to derive a formula for obtaining a plane passing through p0, p1, and p2.

$$\vec{V} \cdot \overrightarrow{(p-p0)} = 0$$

(2)

In Formula 2, p represents any point on the plane. The candidate determination unit 150 regards the plane represented by the derived formula (plane serving as set of p's satisfying Formula 2) as the plane passing through p0, p1, and p2.

In steps S404, the candidate determination unit 150 calculates a distance between the plane obtained in step S403 and each of the feature points included in the set of extracted feature points, and counts the number of feature points each located at a distance smaller than a set threshold value. Through the processing, the candidate determination unit 150 acquires the number of feature points regarded as being included in the plane obtained in step S403 among the set of extracted feature points. The candidate determination unit 150 stores the acquired number of feature points in the storage unit 103 in association with the plane obtained in step S403.

In step S405, the candidate determination unit 150 determines whether all combinations of three feature points among the set of extracted feature points have been extracted in step S402. If the candidate determination unit 150 determines that all the combinations of three feature points among the set of extracted feature points have been extracted in step S402 (YES in step S405), the candidate determination unit 150 advances the process to step S406. If the candidate determination unit 150 determines that there is a combination of three feature points among the set of extracted feature points that has not been extracted in step S402 (NO in step S405), the candidate determination unit 150 advances the process to step S402.

In step S406, the candidate determination unit 150 identifies the largest number of feature points among the numbers of feature points stored in the storage unit 103 in step S404. The candidate determination unit 150 stores, in the storage unit 103, information about the formula derived in step S403 and representing the plane corresponding to the identified number of feature points, and also stores, in the storage unit 103, the identified number of feature points. In the description below, the plane represented by the formula, information of which is stored in step S406, serves as a target plane.

In step S407, the candidate determination unit 150 determines whether the number of feature points stored in step S406 is smaller than a threshold value set as a ratio of the number of feature points to the number of all feature points indicated by the feature position information. If the number of feature points stored in step S406 is determined to be the threshold value or more (NO in step S407), the candidate determination unit 150 determines a region of the target plane as a candidate region, and the candidate determination unit 150 advances the process to step S408. If the candidate determination unit 150 determines that the number of feature points stored in step S406 is smaller than the threshold value (YES in step S407), the candidate determination unit 150 advances the process to step S414.

A plane including a plane portion of an object existing in the real space includes feature points on the object. Thus, in the present exemplary embodiment, it is assumed that such a plane includes more feature points than other planes (e.g., plane not overlapping with the plane portion of object) in the real space.

In the present exemplary embodiment, if the number of feature points stored in step S406 is the set threshold value or more, the candidate determination unit 150 determines the target plane to be a plane including the plane portion of the object of some kind, and the candidate determination unit 150 advances the process to step S408.

In step S408, the region determination unit 160 updates a value of the plane detection flag set to each of the feature points (feature points corresponding to the number of feature points stored in step S406) to 1.

Figure 6:
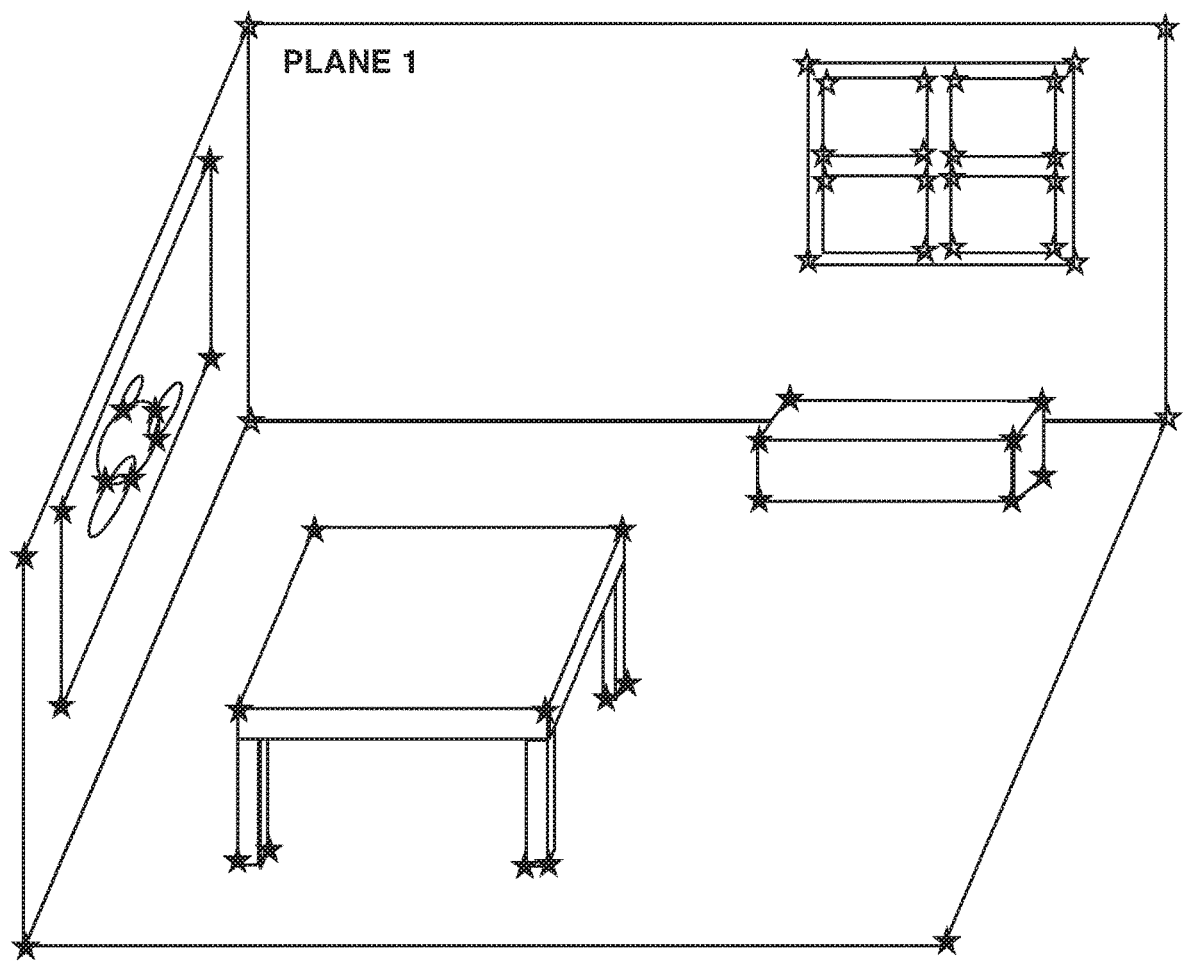
FIG. 6 is a diagram illustrating an example of processing for estimating the recommended region to which the features are added.

A state illustrated in FIG. 6 is an example of a state after the processing in step S408 is completed. A plane 1 illustrated in FIG. 6 represents the target plane. FIG. 6 illustrates that the value of the plane detection flag set to each of the feature points included in the plane 1 becomes 1.

In step S409, the region determination unit 160 extracts a set of feature points each having the value of the corresponding plane detection flag updated to 1 in step S408.

Figure 7:
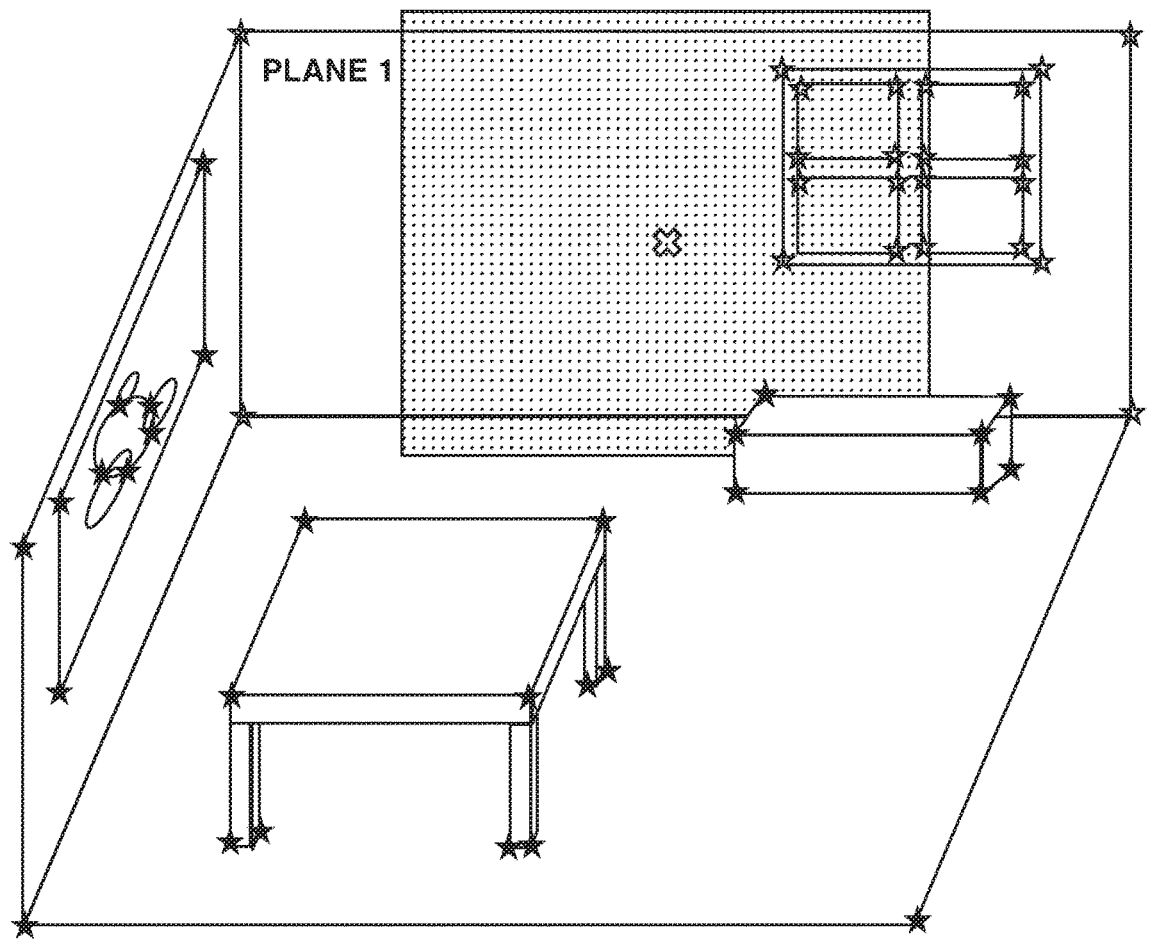
FIG. 7 is a diagram illustrating an example of processing for estimating the recommended region to which the features are added.

In step S410, the region determination unit 160 obtains a centroid of the set of feature points (centroid of the plane) extracted in step S409 and a longitudinal deviation and a lateral deviation on the target plane. Then, the region determination unit 160 identifies a region having a width corresponding to the obtained longitudinal deviation and a width corresponding to the obtained lateral deviation centering on the calculated centroid on the target plane. In the description below, the region identified in step S410 is referred to as a target region. FIG. 7 illustrates an example of the target region identified in step S410.

The region determination unit 160 stores, in the storage unit 103, a size S having a longitudinal width and a lateral width that are one-half of the obtained longitudinal deviation and the obtained lateral.

In step S411, the region determination unit 160 determines a size of a search window that is used in a search for a region in which feature points are sparse in the region identified in step S410, to be the size S.

In step S412, the region determination unit 160 repeats the following processing while scanning the target region with the search window having the size S until scanning of the entire target region is completed. More specifically, the region determination unit 160 identifies the number of feature points included in the search window in the target region, and if the number of identified feature points is a set threshold value or less, the region determination unit 160 determines a region of the search window at this time to be a region in which features are sparse. Subsequently, the region determination unit 160 determines the determined region in which the features are sparse to be a recommended region to which features are added. Subsequently, the region determination unit 160 stores, in the storage unit 103, store information about the region of the search window as information about the recommended region to which the features are added.

Figure 8:
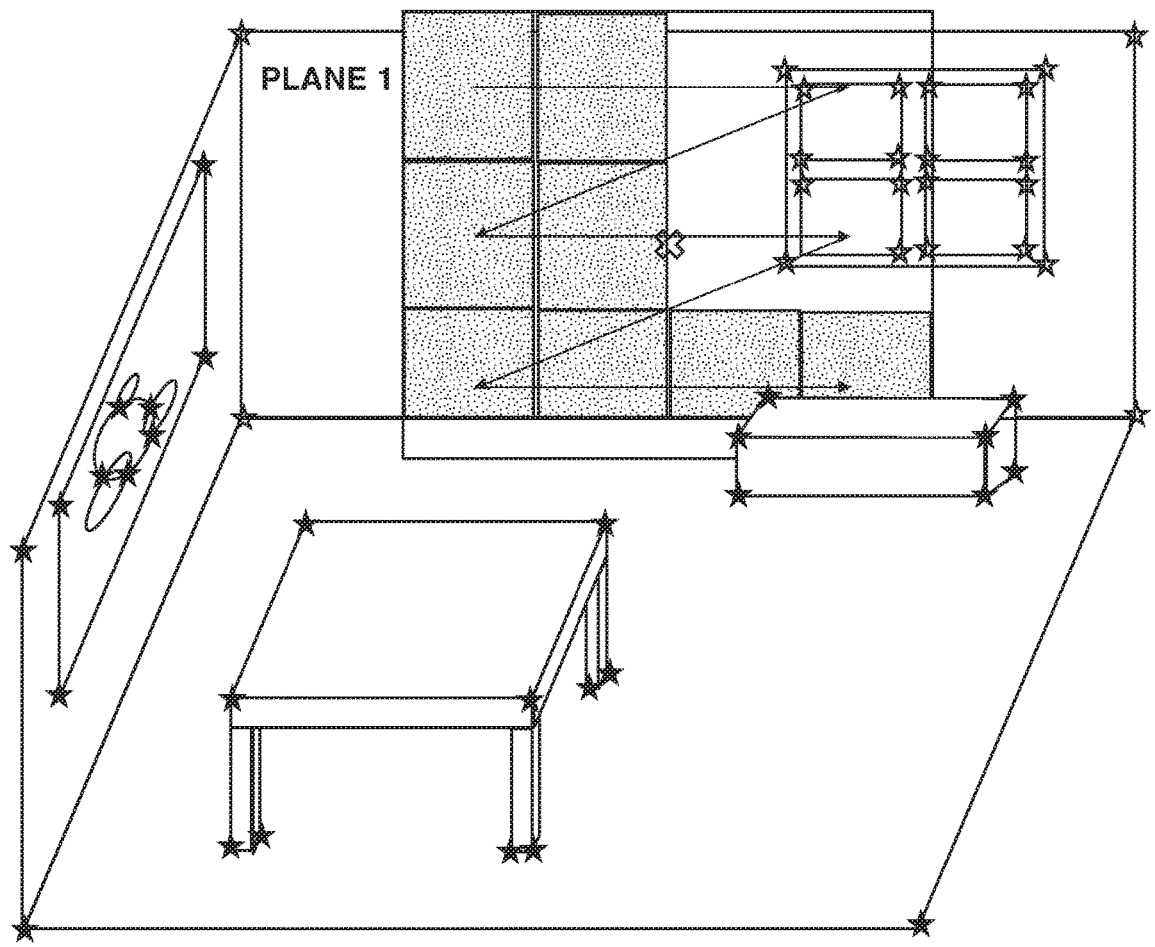
FIG. 8 is a diagram illustrating an example of processing for estimating the recommended region to which the features are added.

FIG. 8 illustrates an example of the recommended region to which the features are added and that has been determined in the processing in step S412.

In step S413, the region determination unit 160 updates the value of the size S with a value obtained by reducing the longitudinal width and the lateral width to half. Then, the region determination unit 160 determines whether the updated size S is a set threshold value or more. If the region determination unit 160 determines that the updated size S is the set threshold value or more (YES in step S413), the region determination unit 160 advances the process to step S411. If the region determination unit 160 determines that the updated size S is less than the set threshold value (NO in step S413) the region determination unit 160 advances the process to step S401.

Figure 9:
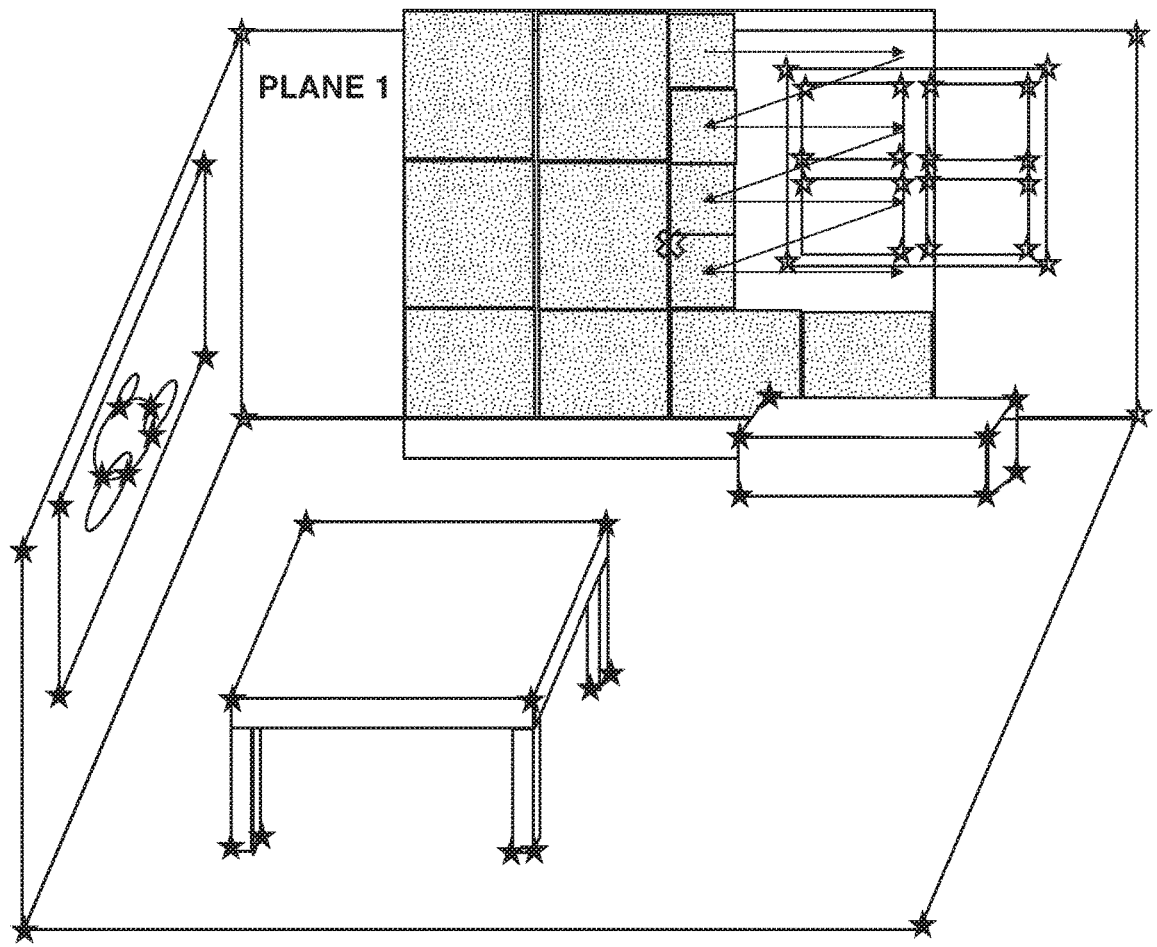
FIG. 9 is a diagram illustrating an example of processing for estimating the recommended region to which the features are added.

FIG. 9 illustrates an example of the determined recommended region to which the features are added at the time when the updated size S is determined to be less than the threshold value in the processing in step S413.

After the processing proceeds from step S413 to step 401, in step S407, the image processing apparatus 100 repeats the processing from step S401 to S413 until the number of feature points stored in step S406 is determined to be smaller than the threshold value.

Figure 10:
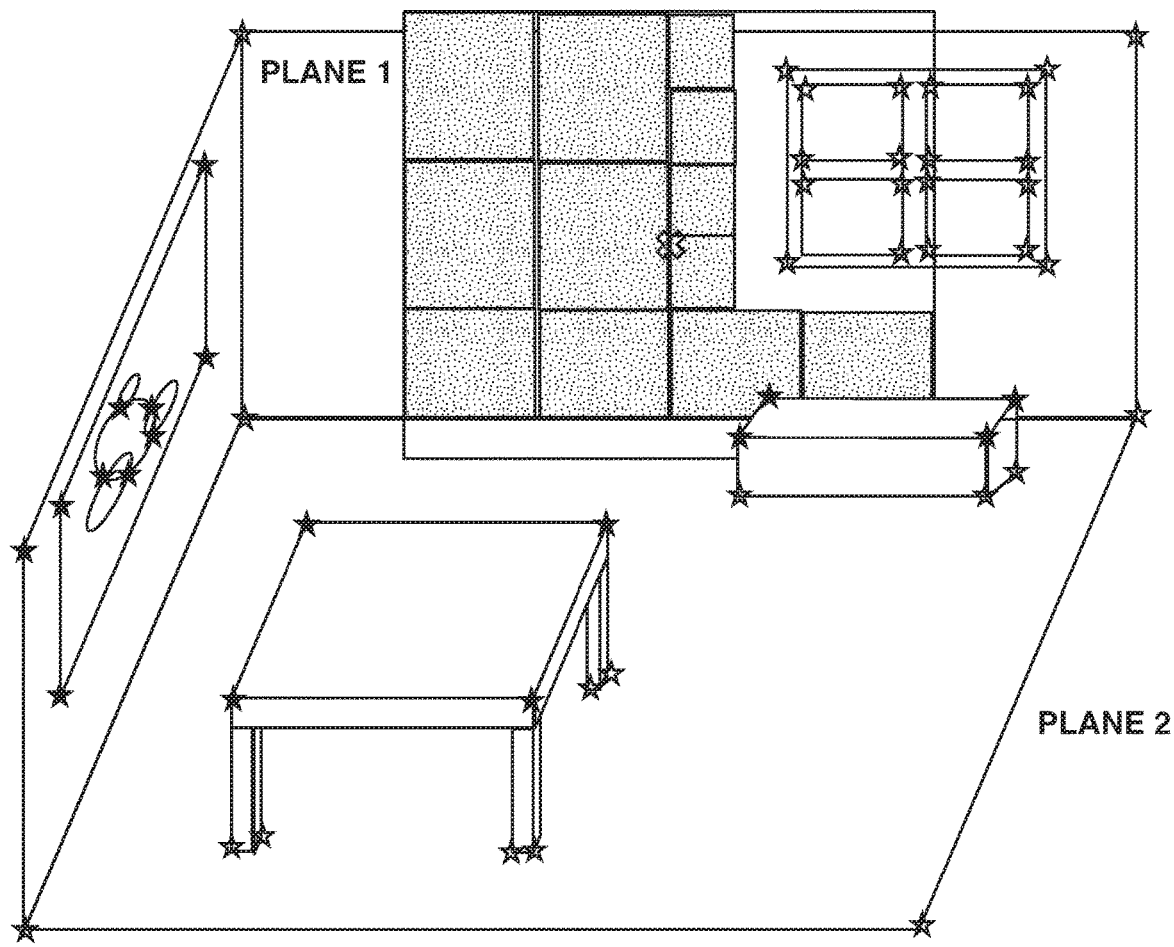
FIG. 10 is a diagram illustrating an example of processing for estimating the recommended region to which the features are added.

For example, the candidate determination unit 150 extracts feature points to which the plane detection flags are not set in the processing in step S401 for the second time. Feature points after the completion of the processing in step S408 for the second time are illustrated in FIG. 10. FIG. 10 illustrates a state in which the plane detection flags set to the feature points included in the plane 1 and plane detection flags set to feature points included in a plane 2 (target plane) become 1.

Figure 11:
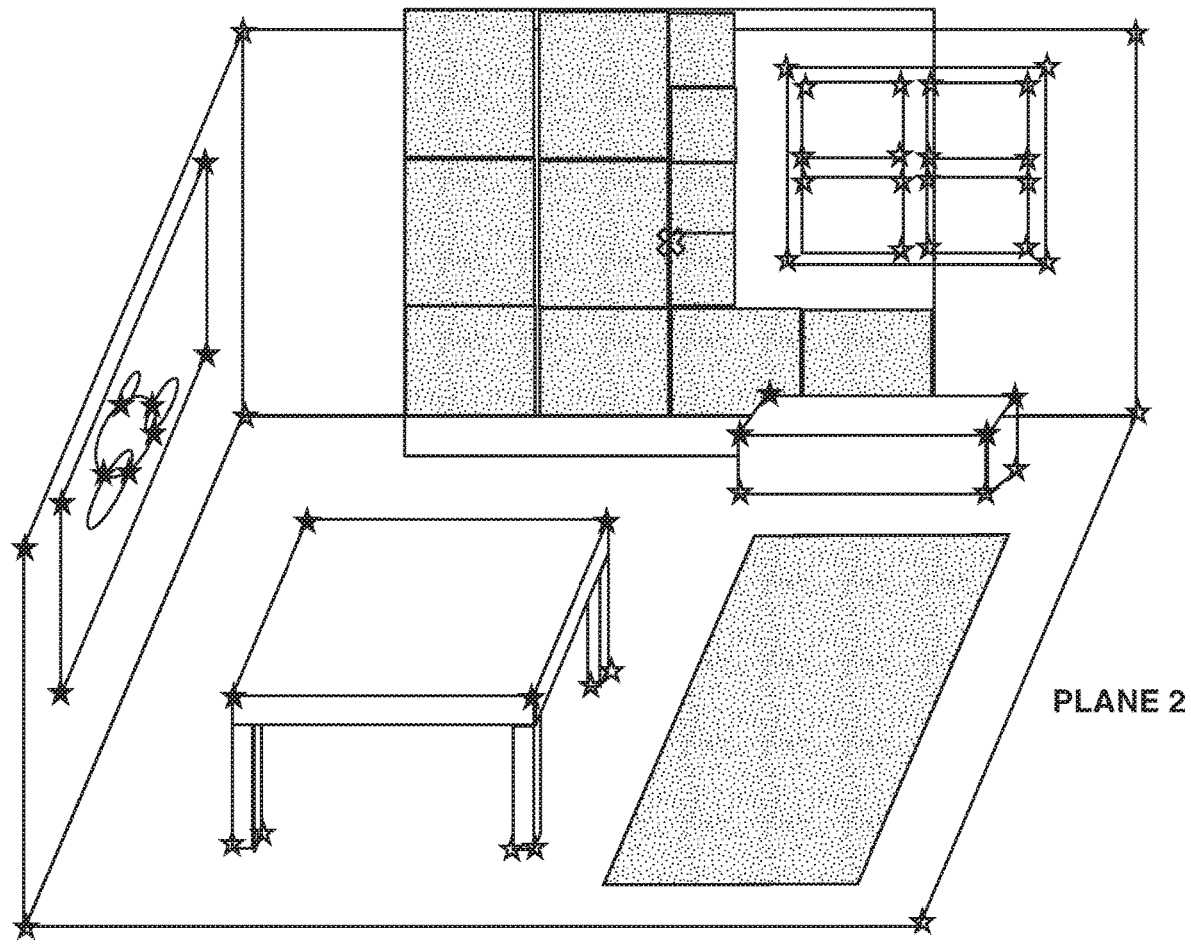
FIG. 11 is a diagram illustrating an example of processing for estimating the recommended region to which the features are added.

FIG. 11 illustrates an example of the determined recommended regions to which the features are added at the time when the updated size S is determined to be smaller than the set threshold value in the processing in step S413 in the case described above. It can be found from FIG. 11 that the recommended region to which the features are added is determined in the plane 2.

Figure 12:
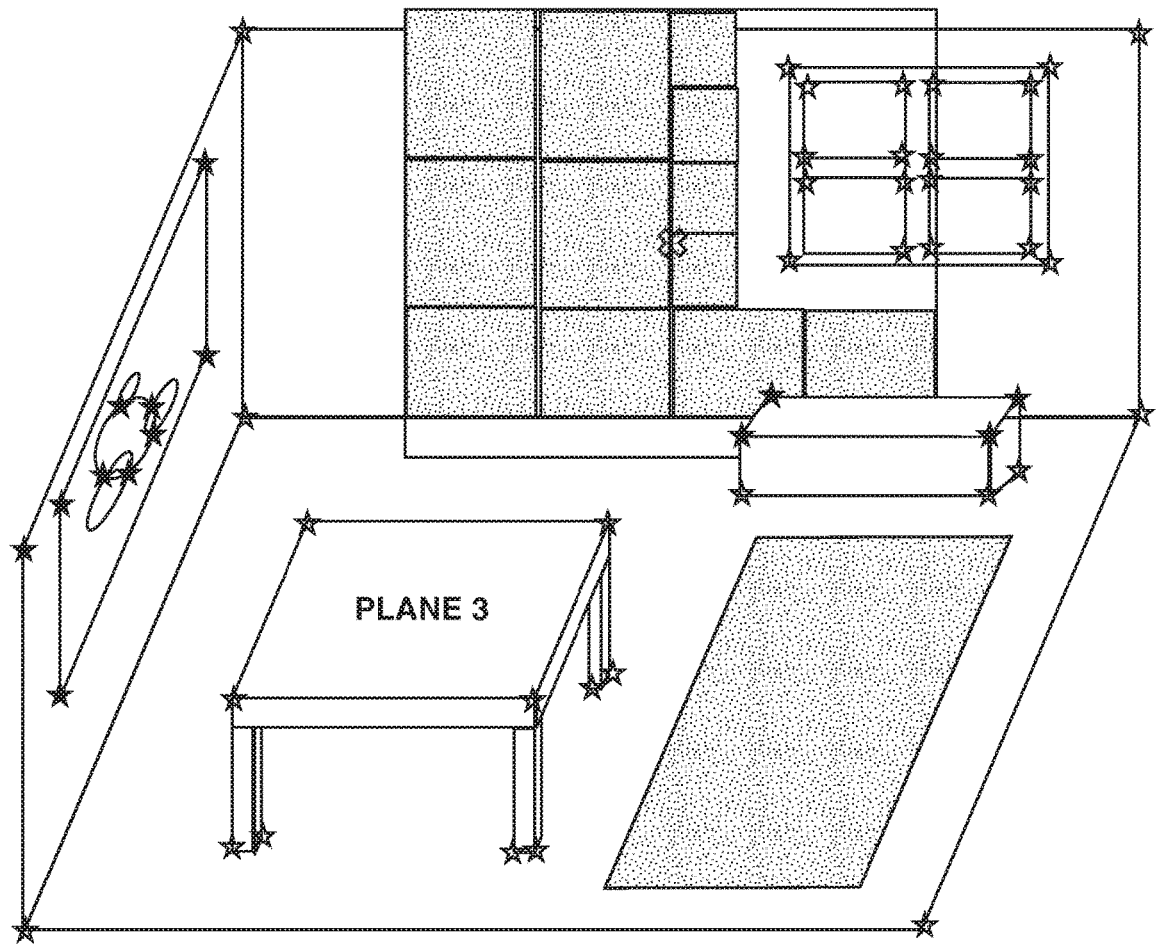
FIG. 12 is a diagram illustrating an example of processing for estimating the recommended region to which the features are added.

Further, feature points after the completion of the processing in step S408 for the third time are illustrated in FIG. 12. FIG. 12 illustrates a state in which the plane detection flags set to the feature points included in the planes 1 and 2 and plane detection flags set to feature points included in a plane 3 (target plane) become 1.

Figure 13:
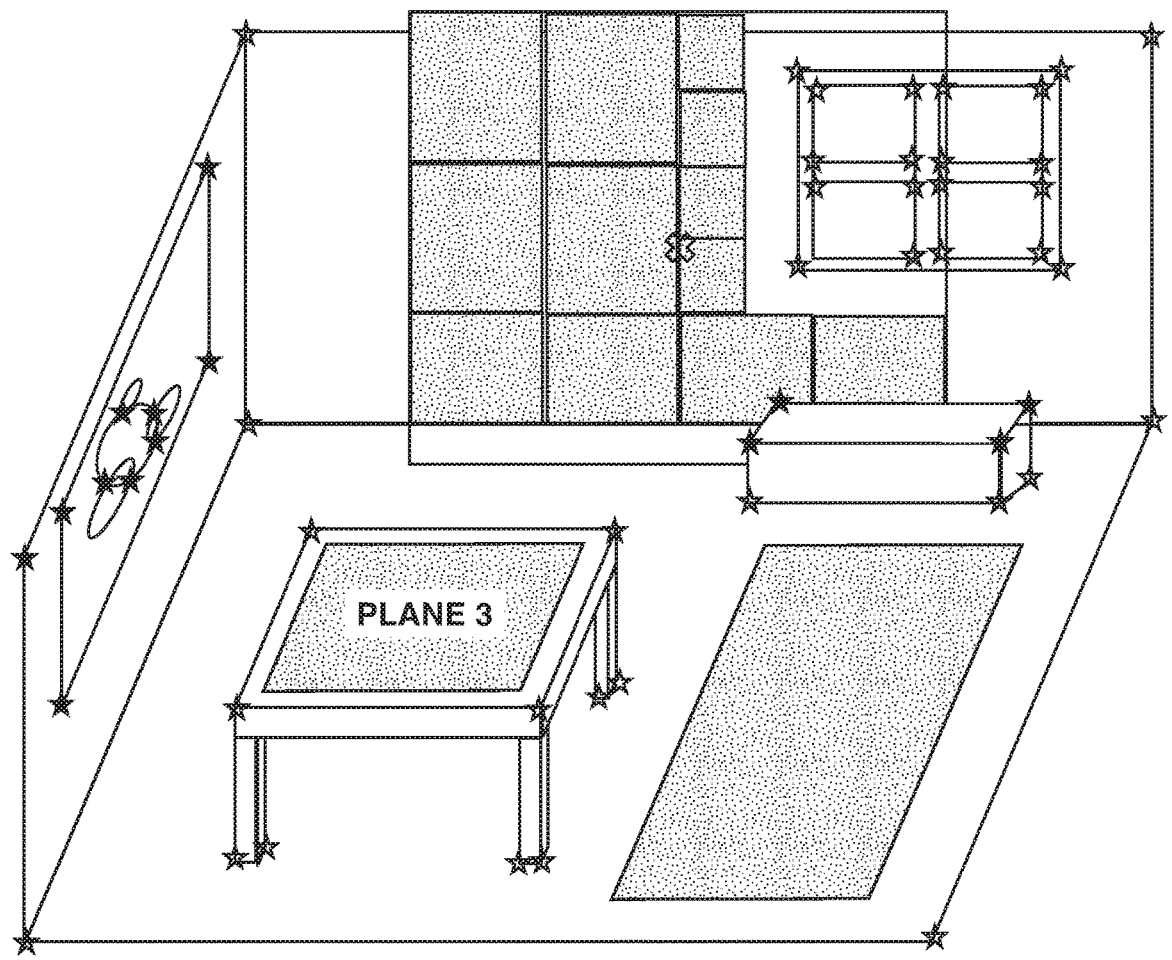
FIG. 13 is a diagram illustrating an example of processing for estimating the recommended region to which the features are added.

FIG. 13 illustrates an example of the determined recommended regions to which the features are added at the time when the updated size S is determined to be smaller than the set threshold value in the processing in step S413 in the case described above. It can be found from FIG. 13 that the recommended region to which the features are added is determined in the plane 3.

In step S414, the region determination unit 160 determines regions indicated by the pieces of information stored in step S412 to be final recommended regions to which the features are added.

The description is given by referring back to FIG. 3.

Figure 14:
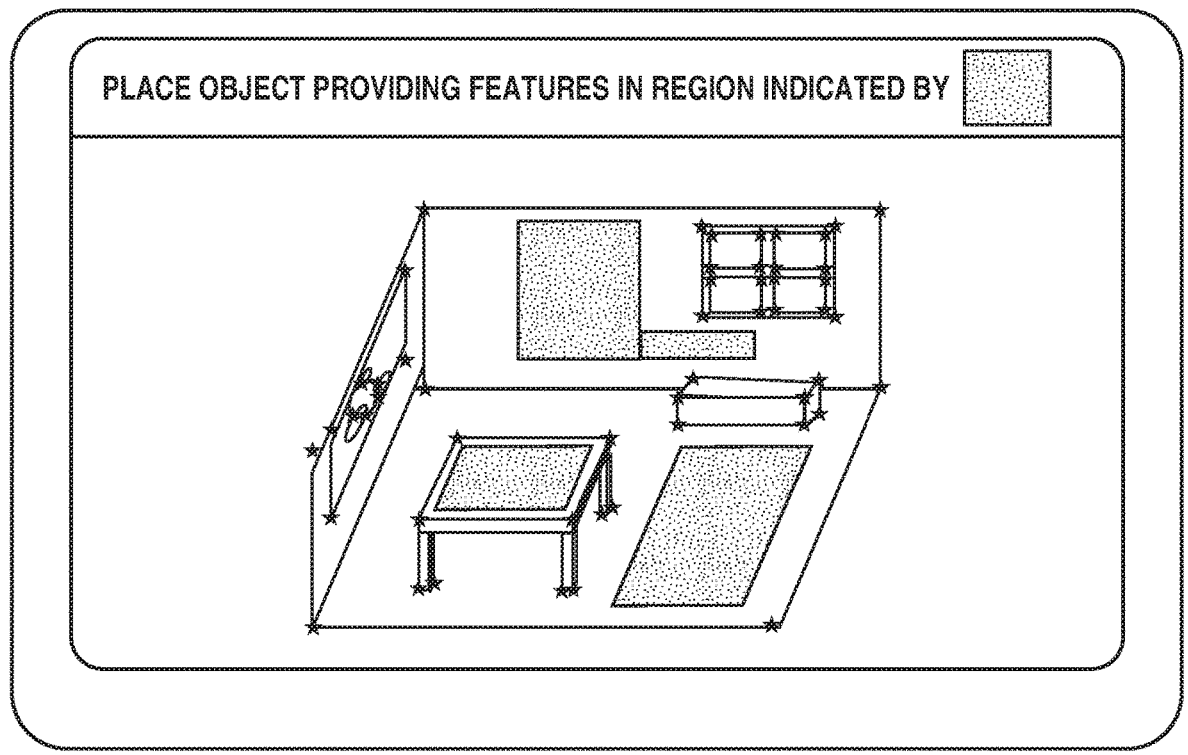
FIG. 14 is a diagram illustrating an example of processing for estimating the recommended region to which the features are added.

In step S350, the region determination unit 160 displays information about the recommended regions to which the features are added and that have been determined in step S414 on the display unit 104. In the present exemplary embodiment, the region determination unit 160 displays the region represented by the information about the recommended regions to which the features are added by superimposing the region on an image in the room. In this case, the region determination unit 160 highlights regions represented by the information about the recommended regions to which the features are added by performing display in a set display mode (e.g., display in set color, blinking display). FIG. 14 illustrates an example of a screen displayed on the display unit 104 in step S350. The example in FIG. 14 illustrates a state in which the recommended regions to which the features are added are displayed in a highlighted manner on a screen provided by an application that renders a mixed reality (MR) space in which computer graphics (CG) are superimposed on the real space, on the display unit 104.

In the present exemplary embodiment, the region determination unit 160 outputs the information about the recommended regions to which the features are added by displaying the information on the display unit 104 in step S350. As another example, the region determination unit 160 may output the information about the recommended regions to which the features are added and that have been determined in step S340 by printing the information on a printing medium via a printing machine. Alternatively, the region determination unit 160 may output the information about the recommended regions to which the features are added and that have been determined in step S340 by transmitting the information to a set transmission destination (e.g., user's terminal).

In the exemplary embodiment described above, the image processing apparatus 100 estimates one or more positions in the real space corresponding to one or more features in an image captured by the image capturing unit 101 based on the captured image and camera parameters of the image capturing unit 101. The image processing apparatus 100 determines one or more candidate regions to which features are added based on the estimated one or more positions, and determines the recommended region to which the features are added based on the number of features included in the region of the search window with which the candidate region is scanned. The user can appropriately grasp a region to which the features are recommended to be added by checking information about the recommended region to which the features are added and that has been determined by the image processing apparatus 100. As a result, the user can add the features in the real space as appropriate. This can achieve appropriate positioning. In other words, the image processing apparatus 100 can contribute to achieving the appropriate positioning.

In the present exemplary embodiment, the image processing apparatus 100 determines a plane region as a recommended region to which features are added. As another example, the image processing apparatus 100 may determine a region other than a plane as the recommended region to which the features are added as long as the region is at a location to which the features can be added by the user and that has sparse features.

A modification will be described citing a case where the image acquisition unit 110 acquires depth data through a depth camera included in the image capturing unit 101. The feature acquisition unit 130 extracts features from a captured image and identifies a surface or a point cloud (set of points in a real space measured by a depth camera) in the real space. The candidate determination unit 150 determines the surface or the point cloud as a candidate region. The region determination unit 160 may scan the candidate region with the search window to determine a recommended region to which features are added in step S412.

In the present exemplary embodiment, the image processing apparatus 100 executes the processing of step S401 to step 414 as the processing in step S340. As another example, the image processing apparatus 100 uses, for example, a search window having a size set to suit the entire region (room inside) serving as a target of image capturing to perform scanning, and determines a region having sparse features through the same processing as that in step S412. The image processing apparatus 100 may determine a region that satisfies set conditions (e.g., plane region) in the determined region having the sparse features as a recommended region to which features are added.

The image processing apparatus 100 may use a machine-learned model for the position estimation unit 140 and the region determination unit 160 among the various functional components to perform the corresponding processing. In this case, a plurality of combinations of input data and output data for the functional component is prepared as learning data. Then, the image processing apparatus 100 acquires knowledge by machine learning from the learning data, and generates a learned model that outputs data with respect to input data in advance based on the acquired knowledge as a result. An example of such a learned model is a neural network model. The learned model, which serves as a program for performing the processing equivalent to that performed by the above-described processing units, performs the processing of the corresponding functional components in collaboration with the CPU, the GPU, and the like. The image processing apparatus 100 may update such a learned model as necessary after performing predetermined processing.

The present invention can be implemented by providing a program that implements one or more functions of the exemplary embodiment described above in a system or an apparatus via a network or a storage media and by one or more processors in a computer of the system or the apparatus reading and executing the program. Further, the present invention can also be implemented by a circuit (e.g., Application Specific Integrated Circuit (ASIC)) having one or more functions.

For example, a part or the whole of the functional components of the image processing apparatus 100 can be implemented in the image processing apparatus 100 as hardware. While the exemplary embodiment of the present invention have been described as above, the present invention is not limited to the particular exemplary embodiments. For example, the exemplary embodiments may be arbitrary combined.

The present invention can contribute to achieving appropriate positioning.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-106238, filed Jun. 6, 2019, which is hereby incorporated by reference herein in its entirety.

What is claimed is:

1. An information processing apparatus, comprising:
one or more processors; and
one or more memories coupled to the one or more processors, the one or more memories having stored thereon instructions which, when executed by the one or more processors, cause the apparatus to:
acquire an image captured by an image capturing unit;
detect a plurality of features from the acquired image and estimate three-dimensional positions of the respective plurality of features in a three-dimensional real space;
detect one or more planar regions each including a subset of the plurality of features from a surface of an object existing in the three-dimensional real space by calculating a distance between a plane identified based on the estimated three-dimensional positions of three features selected from among the plurality of features and each of the estimated three-dimensional positions of features other than the selected three features and set the detected one or more planar regions as one or more candidate regions to which new features can be added;
select a recommendation region to which an addition of the new features are to be recommended, from the one or more candidate regions based on a distribution of features in each of the one or more candidate regions; and
cause a display device to display the recommendation region in the acquired image.

2. The information processing apparatus according to claim 1, wherein the instructions, when executed by the one or more processors, further cause the apparatus to identify a group of features belonging to the one or more planar regions on the surface of the object existing in the three-dimensional real space based on a distribution of the three-dimensional position corresponding to each of the plurality of features, and detect the one or more planar regions based on the group of features.

3. The information processing apparatus according to claim 2, wherein, in a case where the number of the features included in a candidate region of the one or more candidate regions is a first threshold value or less, select the candidate region to be the recommendation region to which the addition of the new features are to be recommended.

4. The information processing apparatus according to claim 1, wherein the instructions, when executed by the one or more processors, further cause the apparatus to calculate the distance and acquire the number of features for which the distance is less than a second threshold value as the number of the features included in the plane identified based on the three-dimensional positions of the three features.

5. The information processing apparatus according to claim 1, wherein the instructions, when executed by the one or more processors, further cause the apparatus to, in a case where the number of the features included in the plane is a predetermined third threshold value or more, identify the plane as the plane of the object existing in the real space.

6. The information processing apparatus according to claim 5, wherein the instructions, when executed by the one or more processors, further cause the apparatus to determine the recommendation region to which the addition of the new features are to be recommended, based on a distribution of the features included on the surface of the object existing in the real space.

7. The information processing apparatus according to claim 6, wherein the instructions, when executed by the one or more processors, further cause the apparatus to determine, on the surface of the object existing in the real space, a set of small regions not including the plurality of features, the three-dimensional positions of which have been estimated, as the recommendation region to which the addition of the new features are to be recommended.

8. The information processing apparatus according to claim 6, wherein the instructions, when executed by the one or more processors, further cause the apparatus to determine, on the surface of the object existing in the real space, a portion not including any of the plurality of features included in the acquired image, the three-dimensional positions of which have been estimated, as the recommendation region to which the addition of the new features are to be recommended.

9. The information processing apparatus according to claim 6, wherein the instructions, when executed by the one or more processors, further cause the apparatus to determine, on the surface of the object existing in the real space, a portion having sparse features, the three-dimensional positions of which have been estimated by the estimation unit, as the recommendation region to which the addition of the new features are to be recommended.

10. The information processing apparatus according to claim 1, wherein the object existing in the real space includes any one of a wall surface, a floor and a table.

11. The information processing apparatus according to claim 1, wherein the recommendation region to which the addition of the new features are to be recommended does not include a portion in midair in the real space.

12. The information processing apparatus according to claim 1, wherein the instructions, when executed by the one or more processors, further cause the apparatus to acquire a camera parameter of the image capturing unit,
wherein the three-dimensional position in the real space corresponding to each of the plurality of features included in the acquired image is estimated based on the image and on the camera parameter.

13. The information processing apparatus according to claim 12, wherein the three-dimensional position in the real space corresponding to each of the plurality of features included in the acquired image is estimated by using a learned model having learned by using the camera parameter acquired as input data and the three-dimensional position of each of the features in the real space as output data.

14. The information processing apparatus according to claim 1, wherein the recommendation region to which the addition of the new features are to be recommended is selected using a learned model having learned by using the one or more candidate regions as input data and the recommendation region to which the addition of the new features are to be recommended as output data.

15. The information processing apparatus according to claim 1, wherein the instructions, when executed by the one or more processors, further cause the apparatus to select the recommendation region from the one or more candidate regions based on the number of features included in a partial region set in each of the one or more candidate regions.

16. An information processing method performed by an information processing apparatus, the method comprising:
acquiring an image captured by an image capturing unit;
detecting a plurality of features from the acquired image and estimating three-dimensional positions of the respective plurality of features in a three-dimensional real space;
detecting one or more planar regions each including a subset of the plurality of features from a surface of an object existing in the three-dimensional real space by calculating a distance between a plane identified based on the estimated three-dimensional positions of three features selected from among the plurality of features and each of the estimated three-dimensional positions of features other than the selected three features and setting the detected one or more planar regions as one or more candidate regions to which new features can be added;
selecting a recommendation region to which an addition of the new features are to be recommended, from the one or more candidate regions, based on a distribution of features in each of the one or more candidate regions; and
causing a display device to display the recommendation region in the acquired image.

17. A non-transitory computer-readable recording medium storing a program that causes a computer to function as an information processing apparatus that performs operations comprising:
acquiring an image captured by an image capturing unit;
detecting a plurality of features from the acquired image and estimating three-dimensional positions of the respective plurality of features in a three-dimensional real space;
detecting one or more planar regions each including a subset of the plurality of features from a surface of an object existing in the three-dimensional real space by calculating a distance between a plane identified based on the estimated three-dimensional positions of three features selected from among the plurality of features and each of the estimated three-dimensional positions of features other than the selected three features and setting the detected one or more planar regions as one or more candidate regions to which new features can be added;
selecting a recommendation region to which an addition of the new features are to be recommended, from the one or more candidate regions, based on a distribution of features in each of the one or more candidate regions; and
causing a display device to display the recommendation region in the acquired image.

* * * * *